(12) United States Patent
Dominy et al.

(10) Patent No.: US 8,390,997 B1
(45) Date of Patent: Mar. 5, 2013

(54) PORTABLE COMPUTER WITH ADJUSTABLE MONITOR

(76) Inventors: Brenda Dominy, Victoria (CA); Ken Dominy, Victoria (CA)

( * ) Notice: Subject to any disclaimer, the term of this patent is extended or adjusted under 35 U.S.C. 154(b) by 162 days.

(21) Appl. No.: 12/899,160

(22) Filed: Oct. 6, 2010

Related U.S. Application Data

(60) Provisional application No. 61/248,913, filed on Oct. 6, 2009.

(51) Int. Cl.
*H05K 5/00* (2006.01)
*H05K 7/00* (2006.01)

(52) U.S. Cl. ......... 361/679.27; 361/679.05; 361/679.28; 361/679.29

(58) Field of Classification Search ............. 361/679.05, 361/679.27, 679.28, 679.29
See application file for complete search history.

(56) References Cited

U.S. PATENT DOCUMENTS

| | | | |
|---|---|---|---|
| 4,960,256 A | 10/1990 | Chihara et al. | |
| 5,128,662 A | 7/1992 | Failla | |
| 5,168,426 A | 12/1992 | Hoving et al. | |
| 5,255,214 A | 10/1993 | Ma | |
| 5,375,076 A | 12/1994 | Goodrich et al. | |
| D366,032 S | 1/1996 | Soderburg | |
| 5,481,430 A | 1/1996 | Miyagawa et al. | |
| 5,494,447 A | 2/1996 | Zaidan | |
| 5,507,072 A | 4/1996 | Youn | |
| 5,729,429 A | 3/1998 | Margaritis et al. | |
| 5,768,096 A | 6/1998 | Williams et al. | |
| 5,949,643 A | 9/1999 | Batio | |
| 6,016,171 A * | 1/2000 | Tsao | 348/836 |
| 6,081,207 A | 6/2000 | Batio | |
| 6,229,693 B1 | 5/2001 | Karidis et al. | |
| 6,233,138 B1 | 5/2001 | Osgood | |
| 6,272,006 B1 | 8/2001 | Lee | |
| 6,464,195 B1 | 10/2002 | Hildebrandt | |
| 6,665,175 B1 | 12/2003 | deBoer et al. | |
| 7,724,511 B2 * | 5/2010 | Jacobs | 361/679.27 |
| 7,917,993 B2 * | 4/2011 | Park | 16/239 |
| 2004/0228077 A1 | 11/2004 | Hall et al. | |
| 2007/0041151 A1 * | 2/2007 | Park | 361/681 |
| 2007/0206349 A1 * | 9/2007 | Jacobs | 361/683 |
| 2008/0174943 A1 * | 7/2008 | Hirasawa et al. | 361/681 |

\* cited by examiner

*Primary Examiner* — Anthony Haughton
(74) *Attorney, Agent, or Firm* — Montgomery Patent & Design LLC; Robert C. Montgomery

(57) ABSTRACT

A notebook computer with an adjustable screen intended to improve the ergonomic usability of the notebook computer is herein disclosed. A screen portion, while folding up from a keyboard portion, can also be extended in an upward position away from the keyboard with a sliding track hinge located on the rear surface of the screen that connects to the notebook computer body. The functionality of the extended screen allows it to be lifted up from the work surface offering a more comfortable, ergonomic user's position. When not in use it slides back down and folds against the keyboard for a compact overall configuration suitable for storage and transport. The angle and height is fully adjustable to accommodate for any size user, seating configuration, or individual preference.

15 Claims, 5 Drawing Sheets

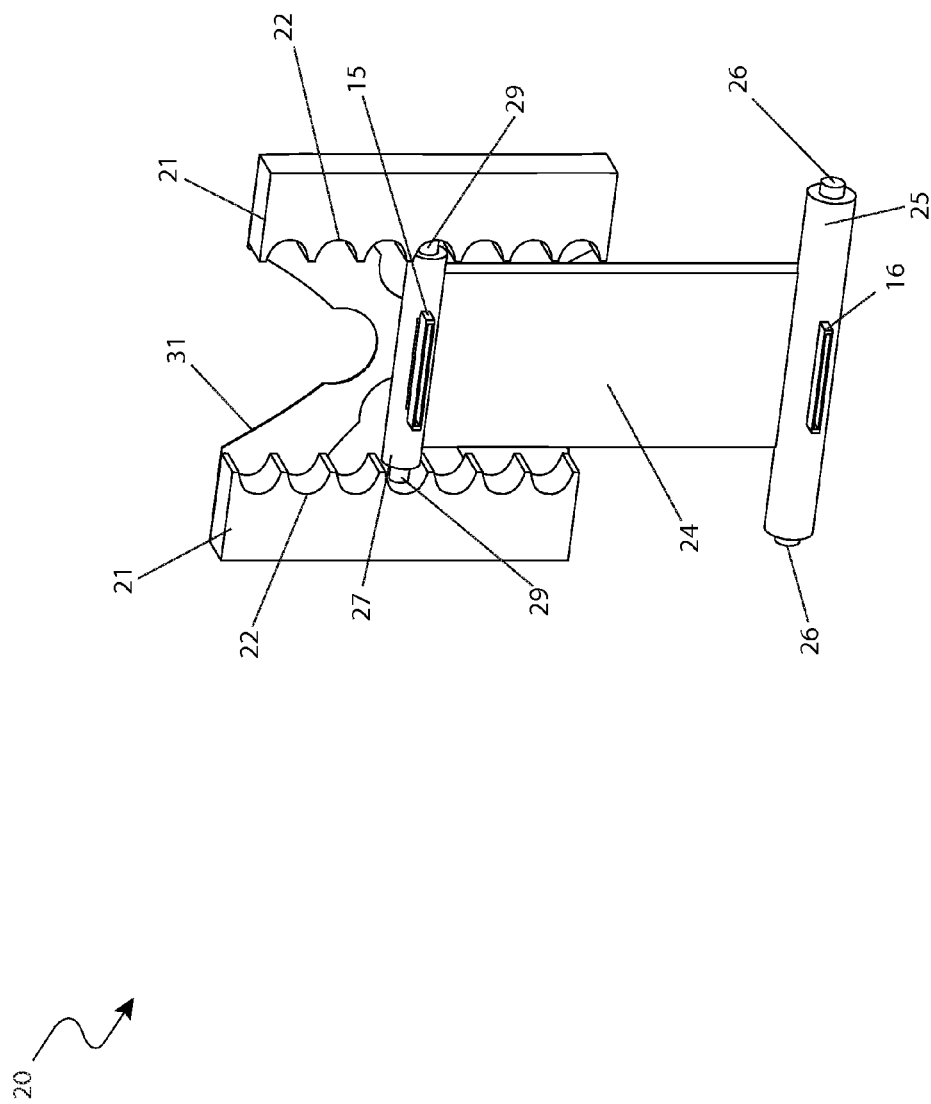

PORTABLE COMPUTER WITH ADJUSTABLE MONITOR

RELATED APPLICATIONS

The present invention was first described in and claims the benefit of U.S. Provisional Application No. 61/248,913 filed Oct. 6, 2009, the entire disclosures of which are incorporated herein by reference.

FIELD OF THE INVENTION

The present invention relates generally to portable computers, and in particular, to an adjustable screen for laptop type computers.

BACKGROUND OF THE INVENTION

As computer technology continues to develop and prices come down, laptop or notebook computers continue to become more prevalent at the office, home, and school. The portability of such computers and the capacity for computing power similar to many desktop computers make them very popular.

One (1) problem commonly associated with portable laptop computers is that the fixed configuration of a notebook screen to the keyboard often forces ergonomic compromises. Many times, a user is forced to hunch over the screen in order to view it at a low elevation. On the other hand, raising the notebook computer by placing it upon a stack of books or the like can make it very uncomfortable and difficult to type on the keyboard. When the computer is actually used in a mobile environment by placing it on one's lap, it becomes very difficult to achieve an angle by which to adequately see the screen, forcing frequent adjustments on the part of the user.

Various attempts have been made to provide adjustable displays for portable computers. Examples of these attempts can be seen by reference to several U.S. patents. U.S. Pat. No. 5,168,426, issued in the name of Hoving et al., describes a hinge mechanism for a portable computer which provides additional range for upward angling of the screen.

U.S. Pat. No. 5,255,214, issued in the name of Ma, describes a portable computer with a level and angular position adjustable display assembly rotatable via a pair of perpendicular supports.

U.S. Pat. No. 5,729,429, issued in the name of Margaritis et al., describes a laptop computer with a plurality of collapsible display positioning supports which provide a large range of height and positioning configurations.

U.S. Pat. No. 6,229,693, issued in the name of Karidis et al., describes an articulated notebook computer display with locking vertical adjustment and full rotational positioning adjustment capabilities.

U.S. Pat. No. 6,665,175, issued in the name of deBoer et al., describes a computer and a monitor that is adjustable in multiple planes via pivoting stanchions attached to the base of the computer.

While these devices fulfill their respective, particular objectives, each of these references suffer from one (1) or more of the aforementioned disadvantages. Many such devices are tedious to adjust. Also, many such devices put undue strain on electrical connections between the computer and the display. Furthermore, many such devices provide an unnecessary range of adjustability which can lead to time wasted while attempting to achieve a desired positioning of the display. Accordingly, there exists a need for a portable computer with an adjustable display without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for an adjustable display for portable computers which provides a minimum range of discrete adjustability while maintaining existing features of collapsibility, convenience, and durability. Thus, the object of the present invention is to solve the aforementioned disadvantages and provide for this need.

To achieve the above objectives, it is an object of the present invention to enable a user to adjust the height and angle of a personal computer display to improve visibility of the display during use. The system comprises a base, a monitor, a monitor back cover, and an adjusting mechanism assembly.

Another object of the present invention is to allow a user to vary the distance between the display and the base of the computer via the adjusting mechanism assembly.

Yet still another object of the present invention is to provide selectable angling of the display relative to the base. The monitor is connected to the base via a bracket and a hinge which provide variable rotation to the display.

Yet still another object of the present invention is to provide secure, durable connection of the electronic connectors between the base and monitor via a ribbon cable contained within hollow configuration of the bracket. The ends of the cable comprise male and female connectors which provide connection to necessary electronic portions of the base and monitor.

Yet still another object of the present invention is to provide discrete incremental adjustment of the elevation of the monitor relative to the base. The adjustment mechanism assembly comprises a pair of parallel racks located within the monitor. Each rack comprises a plurality of ball notches and an upper portion of the bracket comprises a pair of ball detents which correspondingly engage the ball notches of the parallel racks. A user may motion the monitor up or down in order to cause the detents to compress and adjust to an adjacent pair of ball notches.

Yet still another object of the present invention is to allow a user to fold the monitor against the base of the computer in a corresponding manner by placing the monitor in its lowest elevation and rotating the hinge forward as far as possible.

Yet still another object of the present invention is to provide a method of utilizing the device that provides a unique means of obtaining an instance of the system, placing the system in a desired location, placing one hand on the base and utilizing the other hand to rotate the monitor away from the base, grasping the monitor and pulling upwards to adjust the elevation of the monitor to a desired configuration, continuing to adjust the angle and elevation of the monitor relative to the base via the hinge and adjusting mechanism assembly respectively, and folding the system into a collapsed transporting configuration by placing the monitor in its lowest elevation and rotating the hinge forward as far as possible.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 3a is a close-up perspective view of an adjustment mechanism assembly 20, according to the preferred embodiment of the present invention;

DESCRIPTIVE KEY

| | |
|---|---|
| 10 | portable computer with adjustable monitor assembly |
| 11 | base |
| 12 | monitor |
| 13 | monitor back cover |
| 14 | keyboard |
| 15 | monitor male connector |
| 16 | base male connector |
| 17 | base female connector |
| 18 | monitor female connector |
| 19 | ribbon cable |
| 20 | adjusting mechanism |
| 21 | rack |
| 22 | ball notch |
| 24 | bracket |
| 25 | hinge |
| 26 | hinge pin |
| 27 | pivot |
| 29 | ball detent |
| 31 | brace |
| 38 | socket |

DETAILED DESCRIPTION OF THE PREFERRED EMBODIMENT

The best mode for carrying out the invention is presented in terms of its preferred embodiment, herein depicted within FIGS. 1 through 4. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes an adjustable monitor for a portable computer system (herein described as the "system") 10, which provides a means for a personal computer with enhanced features. The system 10 enables an operator to adjust the height and attitude of a monitor 12 to an ergonomically optimal position which improves said operator's comfort and usability of the personal computer.

Figure 1:
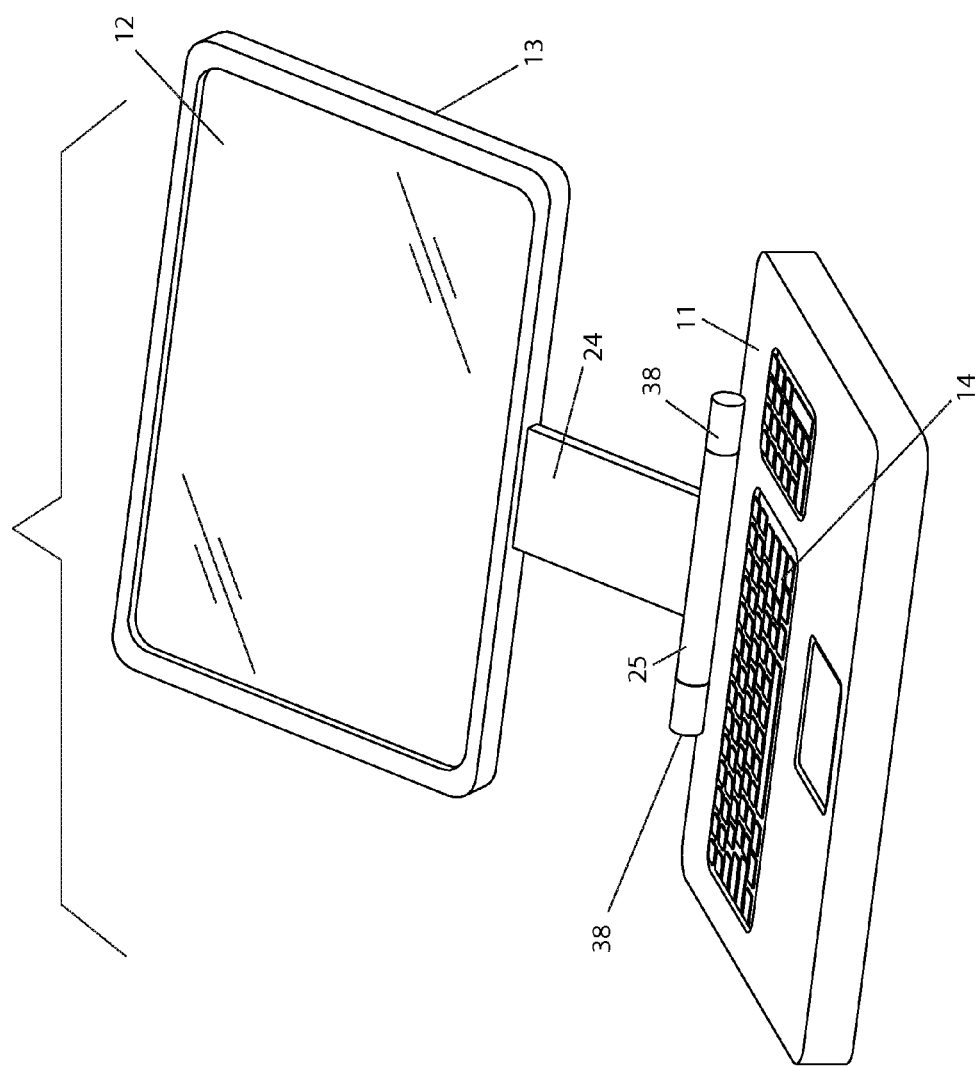
FIG. 1 is a perspective view of an adjustable monitor for a portable computer system 10, according to a preferred embodiment of the present invention.

Referring now to FIG. 1, a perspective view of the system 10, according to a preferred embodiment of the present invention, is disclosed. The system 10 is shown in an assembled operational state and comprises a base 11, a monitor 12, and a monitor back cover 13. The system 10 further comprises an adjusting mechanism assembly 20 which adjusts the monitor 12 away from the base 11 (see FIG. 2). The content of the base 11 is similar to that of a standard notebook-style personal computer further comprises a standard keyboard 14 including a common QWERTY and numerical functions and is to be provided with a sufficient structural thickness and integrity to support an assembly comprising the monitor 12, the monitor back cover 13 and an entire adjusting mechanism assembly 20. The monitor 12 is a standard size which provides the operator with a display device which is preferably a thin filmed liquid crystal display and comprises dimensions preferably measuring seventeen (17) inches in diagonal length, yet other dimensions may be utilized without limiting the scope of the system 10. The monitor back cover 13 encloses the internal circuitry within the monitor 12 via a common snap fitting means and is to be of a similar structural material and integrity as the base 11.

Figure 2:
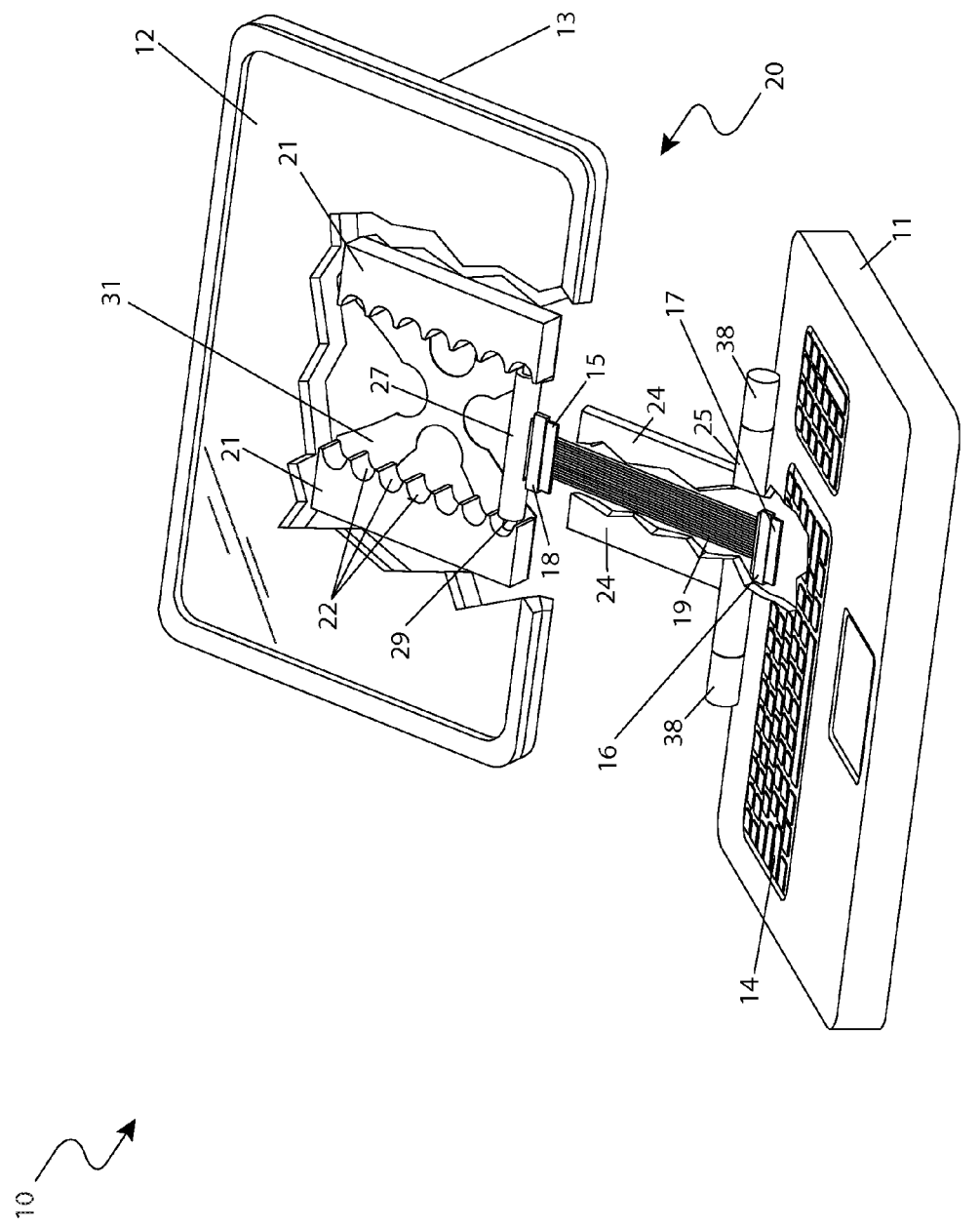
FIG. 2 is a perspective cut-away view of the adjustable monitor for a portable computer 10, according to the preferred embodiment of the present invention.

Referring now to FIG. 2, a perspective cut-away view of the system 10, according to the preferred embodiment of the present invention, is disclosed. The adjusting mechanism assembly 20 comprises a bracket 24, a hinge 25, and a brace 31 which enable the monitor 12 to be oriented at a desired height and attitude away from the base 11. The hinge 25 is mounted to the base 11 and integrally molded to the bracket 24 to provide the desired pivoting angle of the monitor 12. Also depicted herein are a monitor male connector 15, a base male connector 16, a base female connector 17, a monitor female connector 18, and a ribbon cable 19. The assembly of the connectors 15, 16, 17 and 18, provide the electronic connections between the base 11 and the monitor 12 by means of the ribbon cable 19. The monitor male connector 15 connects to the monitor female connector 18 to provide current to the monitor 12 and the base male connector 16 connects to the base female connector 17 to provide current to the base 11. Further depicted herein is the brace 31 which includes a pair of opposing racks 21 and a plurality of ball notches 22 which adjust the height of the monitor 12 to a desired location. The adjusting mechanism 20 is explained in further detail within FIGS. 3a and 3b (see below). The portion of the mechanism assembly 20 housed within the monitor 12 is oriented so as to not interfere with normal operation of said monitor 12 and display.

Figure 3B:
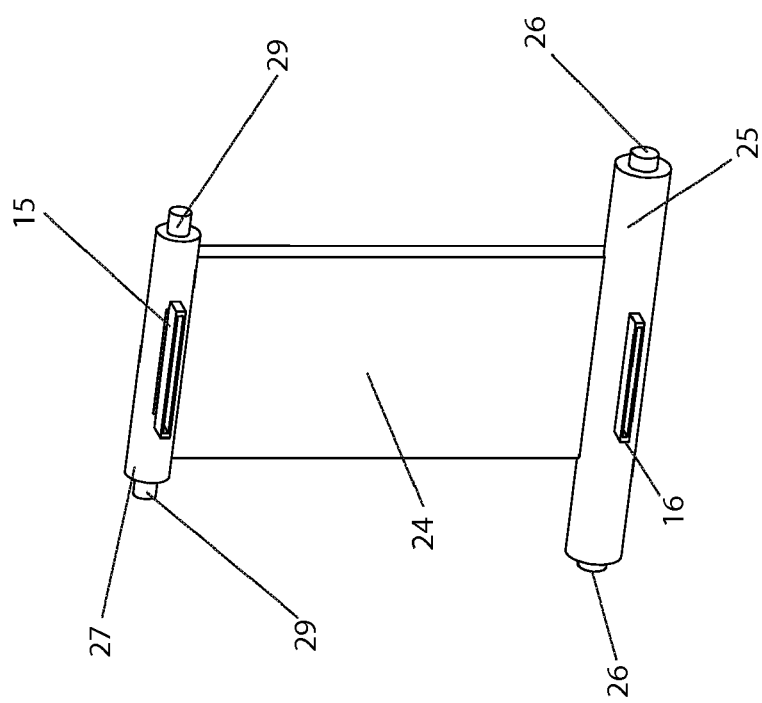
FIG. 3b is a close-up perspective view of a bracket 24 of the adjustment mechanism 20, according to the preferred embodiment of the present invention; and, FIG. 4 is a perspective top view of the adjustable monitor for a portable computer system 10 in a folded state, according to a preferred embodiment of the present invention.

Referring now to FIG. 3a, a close-up perspective view of the adjusting mechanism assembly 20 of the system 10 and FIG. 3b, a perspective detail view of the bracket portion 24 of the system 10, according to the preferred embodiment of the present invention, are disclosed. The adjusting mechanism assembly 20 is located within an interior space of the monitor 12 being securely affixed to an inwardly facing surface of a rear panel portion of said monitor 12 preferably using common adhesives; however, other equivalent joining methods may be utilized such as, but not limited to: screws, rivets, plastic welding, or the like, and as such should not be interpreted as a limiting factor of the system 10. Each of the parallel racks 21 included in the adjusting mechanism assembly 20 comprise a plurality of ball notches 22, whereby each notch 22 of one (1) rack 21 faces a corresponding notch 22 of the opposite rack 21. An upper portion of the bracket 24 comprises a pivot 27 wherein a pair of ball detents 29 engages a corresponding pair of ball notches 22 within the facing portions of the racks 21 which provides an incremental means of adjusting the elevation of the monitor 12. The racks 21 are fixed in a parallel configuration by an interconnecting and integrally-molded brace portion 31. The racks 21 and brace 31 comprise a one-piece injection-molded part; however, for purposes of manufacturing economics, said portions may also comprise separate portions being joined together using a variety of joining methods such as, but not limited to: screws, rivets, plastic welding, or the like, and as such should not be interpreted as a limiting factor of the system 10. A lower portion of a bracket 24 comprises an integral hinge 25, wherein a pair of integral hinge pins 26 assembled within a pair of sockets 38 provide a friction hinge component intended to allow the attitude of the monitor 12 to be adjusted and held within an appropriate attitude.

The ribbon cable 19 is made of a length sufficient to accommodate the vertical adjustment travel transmitted to the monitor 12 by means of the rack 21, to be contained within a hollow configuration of the bracket 24, the integral hinge 25, and the integral pivot 27, and to have its ends permanently affixed onto the male connectors 15 and 16. The male connectors 15 and 16 extend outwardly from the ends of the ribbon cable 19.

Figure 4:
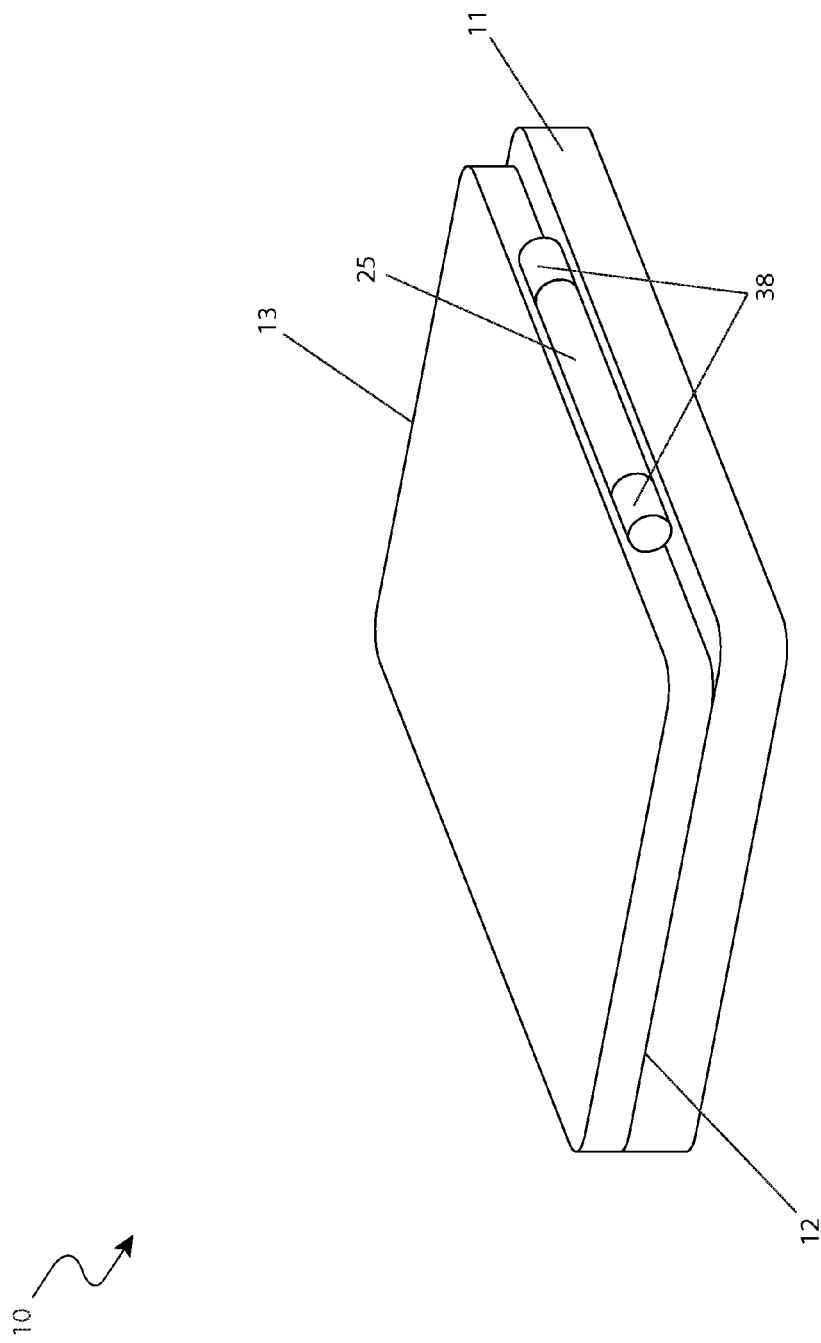

Referring now to FIG. 4, a perspective top view of the portable computer system 10 in a folded state, according to the preferred embodiment of the present invention, is disclosed. To achieve the state depicted herein, the monitor 12 is lowered to the lowest elevation and hinged forward until said monitor 12 is folded onto the base 11. This state is utilized during transportation or storage of the system 10 as desired by the operator.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the system 10, envisioned to be received in the folded status as depicted within FIG. 4 it would be installed as indicated in FIG. 1.

The method of utilizing the system 10 may be achieved by performing the following steps: acquiring the system 10; placing the system 10 onto a desired level location; placing one hand on the base 11 and use the other hand to lift the monitor 12 away from said base 11; placing a hand on the base 11 adjacent to the hinge 25 while using the other hand to raise the monitor 12 by grasping said monitor 12 at a top center portion of its frame; performing final elevation and tilt adjustments by gently moving the monitor 12 into an ergonomically comfortable position; after usage, restoring the monitor 12 to its upright position; lowering the monitor 12 onto its lowest elevation along the bracket 24 by pushing the top edge of the monitor 12 downward with one (1) hand; folding the monitor 12 forward and downward until folded onto the base 11; storing the folded system 10 or inserting it into a travel case as desired; and, utilizing the system 10 to provide an overall ergonomically correct position regardless of the work environment.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A computer system, comprising:
   a portable computer base, further comprising a plurality of user-interface features and a processing unit;
   a monitor in electrical communication with said processing unit, further comprising a monitor cover and a display; and,
   an adjustment mechanism assembly operably connecting said monitor to said portable computer;
   wherein said adjustment mechanism assembly operably adjusts a desired height for said monitor with respect to said portable computer between a fully retracted position and a fully extended position;
   wherein said adjustment mechanism assembly operably adjusts a desired attitude for said monitor with respect to said portable computer between a fully stored position and a fully open position;
   wherein said adjustment mechanism assembly enables said monitor to rest on top of said portable computer base when in said fully stored position;
   wherein said adjustment mechanism assembly further comprises:
   a bracket comprising:
      a lower hinge connection hingedly connected to a central portion of a rear upper edge of said portable computer base; and,
      an upper pivot assembly, further comprising a pair of ball detents horizontally extending outward from opposing sides; and,
   an adjustment mechanism operably connected to said upper pivot assembly of said bracket, said adjustment mechanism securely fixed to said monitor cover;
   wherein said lower hinge connection enables said monitor to pivot to a desired attitude relative to said portable computer base between said fully stored position and said fully open position;
   wherein said adjustment mechanism enables said monitor to extend to a desired height relative to said portable computer base between said fully retracted position and said fully extended position; and,
   wherein said adjustment mechanism does not interfere with operations of said display;
   wherein said bracket is statically engaged with said monitor cover such that said bracket continuously remains coplanar with said monitor cover;
   wherein said bracket has a rectilinear shape provided with a fixed longitudinal length, said bracket being statically coupled to said lower hinge connection; and,
   wherein said bracket is intercalated between front and rear sides of said monitor.

2. The system of claim 1, wherein said lower hinge connection further comprises a pair of hinge pins horizontally extending outward from opposing sides;
   wherein said pair of hinge pins are inserted into a pair of sockets located on an upper rear edge of an upper surface of said portable computer base; and,
   wherein said pair of hinge pins inserted into said pair of sockets provides a friction hinge component, thereby providing an incremental adjustment for said desired attitude.

3. The system of claim 2, wherein said adjustment mechanism further comprises:
   a brace affixed to said monitor cover; and,
   a pair of racks affixed to opposing sides of said brace in a parallel position, each comprising a plurality of vertically aligned ball notches;
   wherein said pair of ball detents of said upper pivot assembly inserted into an aligned pair of said plurality of ball notches provides an incremental adjustment for said desired height.

4. The system of claim 3, further comprising a ribbon cable further comprising:
   a first connection removably attachable to said processing unit of said portable computer base; and,
   a second connection removably attachable to said display of said monitor;
   wherein said ribbon cable is fully enclosed within said monitor cover, said bracket, and said portable computer base;
   wherein said ribbon cable enables electrical communication between said processing unit and said display; and,
   wherein said ribbon cable further comprises a suitable length enabling said monitor to travel between said fully retracted position and said fully extended position, and said fully stored position and said fully open position.

5. The system of claim 4, wherein said monitor further comprises a size coextensive with said portable computer base.

6. The system of claim 4, wherein said brace and said pair of racks comprises a unitary structure.

7. The system of claim 4, wherein said lower hinge connection and said pair of sockets comprise a coextensive outer geometry when said pair of hinge pins is inserted into said pair of sockets.

8. A computer system, comprising:
   a portable computer base, further comprising a plurality of user-interface features and a processing unit;
   a monitor in electrical communication with said processing unit, further comprising a monitor cover and a display; and,
   an adjustment mechanism assembly operably connecting said monitor to said portable computer, further comprising an adjustment mechanism fully housed within said monitor;
   wherein said adjustment mechanism assembly operably adjusts a desired height for said monitor with respect to said portable computer between a fully retracted position and a fully extended position;
   wherein said adjustment mechanism assembly operably adjusts a desired attitude for said monitor with respect to said portable computer between a fully stored position and a fully open position;
   wherein said adjustment mechanism assembly enables said monitor to rest on top of said portable computer base when in said fully stored position;
   wherein said adjustment mechanism assembly further comprises:
   a bracket comprising:
      a lower hinge connection hingedly connected to a central portion of a rear upper edge of said portable computer base; and,
      an upper pivot assembly, further comprising a pair of ball detents horizontally extending outward from opposing sides; and,
   an adjustment mechanism operably connected to said upper pivot assembly of said bracket, said adjustment mechanism housed and securely fixed within said monitor cover;
   wherein said lower hinge connection enables said monitor to pivot to a desired attitude relative to said portable computer base between said fully stored position and said fully open position;
   wherein said adjustment mechanism enables said monitor to extend to a desired height relative to said portable computer base between said fully retracted position and said fully extended position;
   wherein said adjustment mechanism does not interfere with operations of said display;
   wherein said bracket continuously remains coplanar with said monitor;
   wherein said bracket has a rectilinear shape provided with a fixed longitudinal length, said bracket being statically coupled to said lower hinge connection and selectively reciprocated into and out from said monitor; and,
   wherein said bracket is intercalated between front and rear sides of said monitor.

9. The system of claim 8, wherein said lower hinge connection further comprises a pair of hinge pins horizontally extending outward from opposing sides;
   wherein said pair of hinge pins are inserted into a pair of sockets located on an upper rear edge of an upper surface of said portable computer base; and,
   wherein said pair of hinge pins inserted into said pair of sockets provides a friction hinge component, thereby providing an incremental adjustment for said desired attitude.

10. The system of claim 9, wherein said adjustment mechanism further comprises:
    a brace affixed to said monitor cover; and,
    a pair of racks affixed to opposing sides of said brace in a parallel position, each comprising a plurality of vertically aligned ball notches;
    wherein said pair of ball detents of said upper pivot assembly inserted into an aligned pair of said plurality of ball notches provides an incremental adjustment for said desired height.

11. The system of claim 10, further comprising a ribbon cable further comprising:
    a first connection removably attachable to said processing unit of said portable computer base; and,
    a second connection removably attachable to said display of said monitor;
    wherein said ribbon cable is fully enclosed within said monitor cover, said bracket, and said portable computer base;
    wherein said ribbon cable enables electrical communication between said processing unit and said display; and,
    wherein said ribbon cable further comprises a suitable length enabling said monitor to travel between said fully retracted position and said fully extended position, and said fully stored position and said fully open position.

12. The system of claim 11, wherein said monitor further comprises a size coextensive with said portable computer base.

13. The system of claim 11, wherein said brace and said pair of racks comprises a unitary structure.

14. The system of claim 11, wherein said lower hinge connection and said pair of sockets comprise a coextensive outer geometry when said pair of hinge pins is inserted into said pair of sockets.

15. A method for adjusting a monitor of a portable computer to a desired attitude and a desired height comprising the following steps:
- providing said portable computer, further comprising:
  - a portable computer base, further comprising a plurality of user-interface features and a processing unit;
  - a monitor in electrical communication with said processing unit, further comprising a monitor cover and a display;
  - an adjustment mechanism assembly operably connecting said monitor to said portable computer, further comprising:
    - a bracket comprising a lower hinge connection hingedly connected via a pair of hinge pins horizontally extending outward from opposing sides to a central portion of a rear upper edge of said portable computer base and an upper pivot assembly further comprising a pair of ball detents horizontally extending outward from opposing sides; and,
    - an adjustment mechanism operably connected to said upper pivot assembly of said bracket, said adjustment mechanism housed and securely fixed within said monitor cover, further comprising a brace affixed to said monitor cover and a pair of racks affixed to opposing sides of said brace in a parallel position, each comprising a plurality of vertically aligned ball notches, wherein an aligned pair of said ball notches receives said pair of ball detents; and,
    - a ribbon cable fully enclosed within said monitor cover, said bracket, and said portable computer base, further comprising a first connection removably attachable to said processing unit of said portable computer base, and a second connection removably attachable to said display of said monitor;
- pivoting said monitor to said desired attitude with respect to said portable computer base via said lower hinge connection; and,
- lifting said monitor to said desired height with respect to said portable computer base by vertically adjusting said pair of ball detents into a desired aligned pair of said ball notches;
- wherein said bracket continuously remains coplanar with said monitor;
- wherein said bracket has a rectilinear shape provided with a fixed longitudinal length, said bracket being statically coupled to said lower hinge connection and selectively reciprocated into and out from said monitor; and,
- wherein said bracket is intercalated between front and rear sides of said monitor.

* * * * *